US010913237B2

(12) United States Patent
Wei et al.

(10) Patent No.: US 10,913,237 B2
(45) Date of Patent: Feb. 9, 2021

(54) BIAXIALLY ORIENTED MICROPOROUS MEMBRANE

(71) Applicant: Celgard LLC, Charlotte, NC (US)

(72) Inventors: Xiangyun Wei, Charlotte, NC (US); Charles Haire, Lancaster, SC (US)

(73) Assignee: Celgard, LLC, Charlotte, NC (US)

( * ) Notice: Subject to any disclaimer, the term of this patent is extended or adjusted under 35 U.S.C. 154(b) by 1378 days.

(21) Appl. No.: 14/297,688

(22) Filed: Jun. 6, 2014

(65) Prior Publication Data

US 2014/0287322 A1    Sep. 25, 2014

Related U.S. Application Data

(62) Division of application No. 11/674,180, filed on Feb. 13, 2007, now Pat. No. 8,795,565.

(Continued)

(51) Int. Cl.
*B32B 5/32* (2006.01)
*B29C 55/00* (2006.01)
(Continued)

(52) U.S. Cl.
CPC ............ *B32B 5/32* (2013.01); *B01D 67/0027* (2013.01); *B29C 48/08* (2019.02); *B29C 55/005* (2013.01);
(Continued)

(58) Field of Classification Search
CPC .. B32B 5/32; B32B 3/26; B29C 48/08; B29C 55/005; B29C 55/143; B01D 67/0027;
(Continued)

(56) References Cited

U.S. PATENT DOCUMENTS

| 4,138,459 A | 2/1979 | Brazinsky et al. |
| 4,257,997 A | 3/1981 | Soehngen et al. |

(Continued)

FOREIGN PATENT DOCUMENTS

| JP | 11-297297 | 10/1999 |
| JP | 2000017100 A | 1/2000 |

(Continued)

OTHER PUBLICATIONS

R. Kesting, "Synthetic Polymeric Membranes, A Structural Perspective," 2 ed., John Wiley & Sons (New York, NY), (1985).

(Continued)

*Primary Examiner* — Michael N Orlando
*Assistant Examiner* — Elizabeth Bradford
(74) *Attorney, Agent, or Firm* — Hammer & Associates, P.C.

(57) ABSTRACT

A microporous membrane is made by a dry-stretch process and has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction stretching including a simultaneous controlled machine direction relax.

13 Claims, 3 Drawing Sheets

Related U.S. Application Data

(60) Provisional application No. 60/775,112, filed on Feb. 21, 2006.

(51) Int. Cl.

| | | |
|---|---|---|
| *H01M 2/16* | (2006.01) | |
| *B29C 55/14* | (2006.01) | |
| *B01D 67/00* | (2006.01) | |
| *B29C 48/08* | (2019.01) | |
| *C08F 110/06* | (2006.01) | |
| *B32B 3/26* | (2006.01) | |
| *C08J 9/00* | (2006.01) | |
| *C08J 9/228* | (2006.01) | |
| *B29K 105/04* | (2006.01) | |
| *B29C 48/00* | (2019.01) | |

(52) U.S. Cl.
CPC .............. *B29C 55/143* (2013.01); *B32B 3/26* (2013.01); *C08F 110/06* (2013.01); *C08J 9/0061* (2013.01); *C08J 9/228* (2013.01); *H01M 2/1653* (2013.01); *H01M 2/1686* (2013.01); *B01D 2323/08* (2013.01); *B01D 2323/14* (2013.01); *B01D 2325/021* (2013.01); *B29C 48/00* (2019.02); *B29K 2105/04* (2013.01); *Y10T 428/249953* (2015.04); *Y10T 428/249958* (2015.04); *Y10T 428/249975* (2015.04)

(58) Field of Classification Search
CPC ........ C08F 110/06; C08J 9/0061; C08J 9/228; H01M 2/1653; H01M 2/1686
USPC ..................................................... 264/210.1
See application file for complete search history.

(56) References Cited

U.S. PATENT DOCUMENTS

| | | | |
|---|---|---|---|
| 4,298,666 | A | 11/1981 | Taskier |
| 4,330,499 | A | 5/1982 | von und zu Aufsess et al. |
| 4,786,561 | A | 11/1988 | Fong |
| 5,013,439 | A | 5/1991 | Fisher et al. |
| 5,051,225 | A | 9/1991 | Hommes et al. |
| 5,176,953 | A | 1/1993 | Jacoby et al. |
| 5,328,760 | A | 7/1994 | Gillberg-LaForce |
| 5,510,176 | A | 4/1996 | Nakamura et al. |
| 5,565,281 | A | 10/1996 | Yu et al. |
| 5,968,994 | A | 10/1999 | Hashimoto et al. |
| 6,057,061 | A | 5/2000 | Callahan et al. |
| 6,080,507 | A | 6/2000 | Yu |
| 6,540,953 | B1 † | 4/2003 | Lee |
| 6,602,593 | B1 | 8/2003 | Callahan et al. |
| 6,746,803 | B1 | 6/2004 | Bauer et al. |
| 8,795,565 | B2 | 8/2014 | Wei et al. |
| 2001/0038942 | A1 | 11/2001 | Fisher et al. |
| 2005/0202163 | A1 | 9/2005 | Nguyen et al. |
| 2006/0009538 | A1 | 1/2006 | Lee et al. |

FOREIGN PATENT DOCUMENTS

| | | |
|---|---|---|
| JP | 2003238718 A | 8/2003 |
| KR | 2000-0015143 A † | 3/2000 |
| KR | 100443873 B1 | 7/2004 |
| KR | 10-2005-0032907 B1 | 11/2005 |
| WO | WO 99/25464 A1 | 5/1999 |

OTHER PUBLICATIONS

Wei Zhu, et al., "A Novel Polypropylene Microporous Film," Polymers for Advanced Technologies, John Wiley & Sons, Ltd., (vol. 7), (p. 743-748), (1996).

† cited by third party

BIAXIALLY ORIENTED MICROPOROUS MEMBRANE

RELATED APPLICATIONS

The instant application claims priority to and the benefit of U.S. Provisional Patent Application Ser. No. 60/775,112 filed Feb. 21, 2006, and U.S. patent application Ser. No. 11/674,180 filed Feb. 13, 2007, allowed as U.S. Pat. No. 8,795,565.

FIELD OF THE INVENTION

The invention is directed to a biaxially oriented microporous membrane and the method of its manufacture.

BACKGROUND OF THE INVENTION

Microporous membranes are known, can be made by various processes, and the process by which the membrane is made has a material impact upon the membrane's physical attributes. See, Kesting, R., *Synthetic Polymeric Membranes, A structural perspective*, Second Edition, John Wiley & Sons, New York, N.Y., (1985). Three commercially viable processes for making microporous membranes include: the dry-stretch process (also known as the CELGARD process), the wet process, and the particle stretch process.

The dry-stretch process refers to a process where pore formation results from stretching the nonporous precursor. See, Kesting, Ibid. pages 290-297, incorporated herein by reference. The dry-stretch process is different from the wet process and particle stretch process. Generally, in the wet process, also know as the phase inversion process, or the extraction process or the TIPS process (to name a few), the polymeric raw material is mixed with a processing oil (sometimes referred to as a plasticizer), this mixture is extruded, and pores are then formed when the processing oil is removed (these films may be stretched before or after the removal of the oil). See, Kesting, Ibid. pages 237-286, incorporated herein by reference. Generally, in the particle stretch process, the polymeric raw material is mixed with particulate, this mixture is extruded, and pores are formed during stretching when the interface between the polymer and the particulate fractures due to the stretching forces. See, U.S. Pat. Nos. 6,057,061 and 6,080,507, incorporated herein by reference.

Moreover, the membranes arising from these processes are physically different and the process by which each is made distinguishes one membrane from the other. Dry-stretch membranes have slit shaped pores due to the inability to stretch the precursor in the transverse machine direction. Wet process membranes have rounder pores due to the ability to stretch the precursor in the transverse machine direction. Particle stretched membranes, on the other hand, are filled with particulate needed for pore formation. Accordingly, each membrane may be distinguished from the other by its method of manufacture.

While membranes made by the dry-stretch process have met with excellent commercial success, there is a need to improve their physical attributes, so that they may be used in wider spectrum of applications. Some areas of improvement include pore shapes other than slits and increase transverse direction tensile strength.

U.S. Pat. No. 6,602,593 is directed to a microporous membrane, made by a dry-stretch process, where the resulting membrane has a ratio of transverse direction tensile strength to machine direction tensile strength of 0.12 to 1.2. Herein, the TD/MD tensile ratio is obtained by a blow-up ratio of at least 1.5 as the precursor is extruded.

SUMMARY OF THE INVENTION

A microporous membrane is made by a dry-stretch process and has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction including a simultaneous controlled machine direction relax.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

A microporous membrane is made by a dry-stretch process and has substantially round shaped pores and a ratio of machine direction tensile strength to transverse direction tensile strength in the range of 0.5 to 4.0. A microporous membrane is a thin, pliable, polymeric sheet, foil, or film having a plurality of pores therethrough. Such membranes by be used in a wide variety of applications, including, but not limited to, mass transfer membranes, pressure regulators, filtration membranes, medical devices, separators for electrochemical storage devices, membranes for use in fuel cells, and the like.

The instant membrane is made by the dry-stretch process (also known as the CELGARD process). The dry-stretch process refers to a process where pore formation results from stretching the nonporous precursor. See, Kesting, R., *Synthetic Polymeric Membranes, A structural perspective*, Second Edition, John Wiley & Sons, New York, N.Y., (1985), pages 290-297, incorporated herein by reference. The dry-stretch process is distinguished from the wet process and particle stretch process, as discussed above.

The instant membrane may be distinguished from prior dry-stretched membranes in at least two ways: 1) substantially round shape pores, and 2) a ratio of machine direction tensile strength to transverse direction tensile strength in the range of 0.5 to 4.0.

Figure 1:
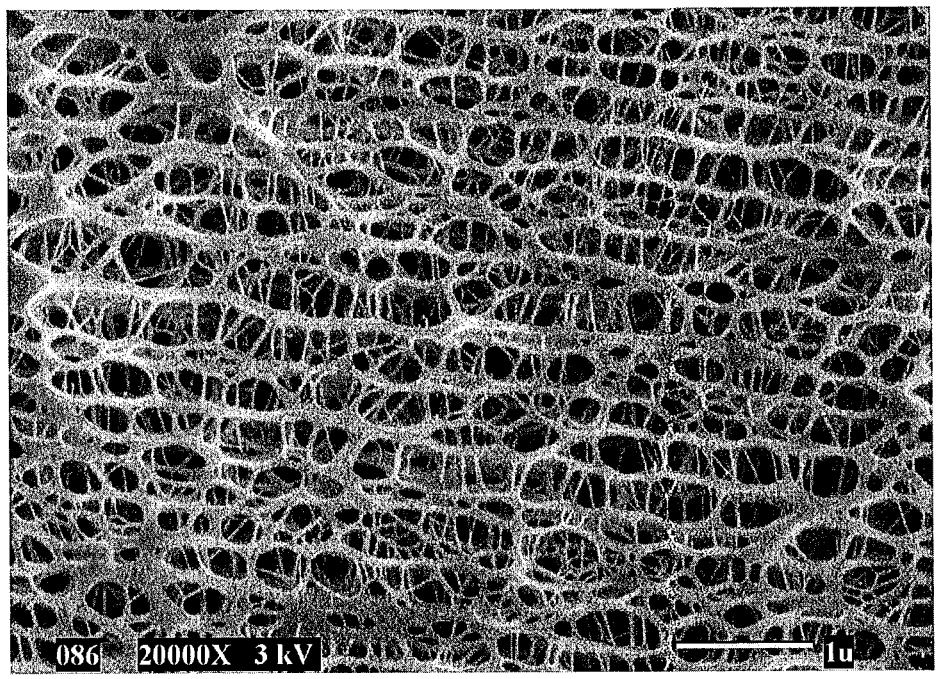
FIG. 1 is a photograph of one embodiment of the instant invention (single ply membrane).
Figure 2:
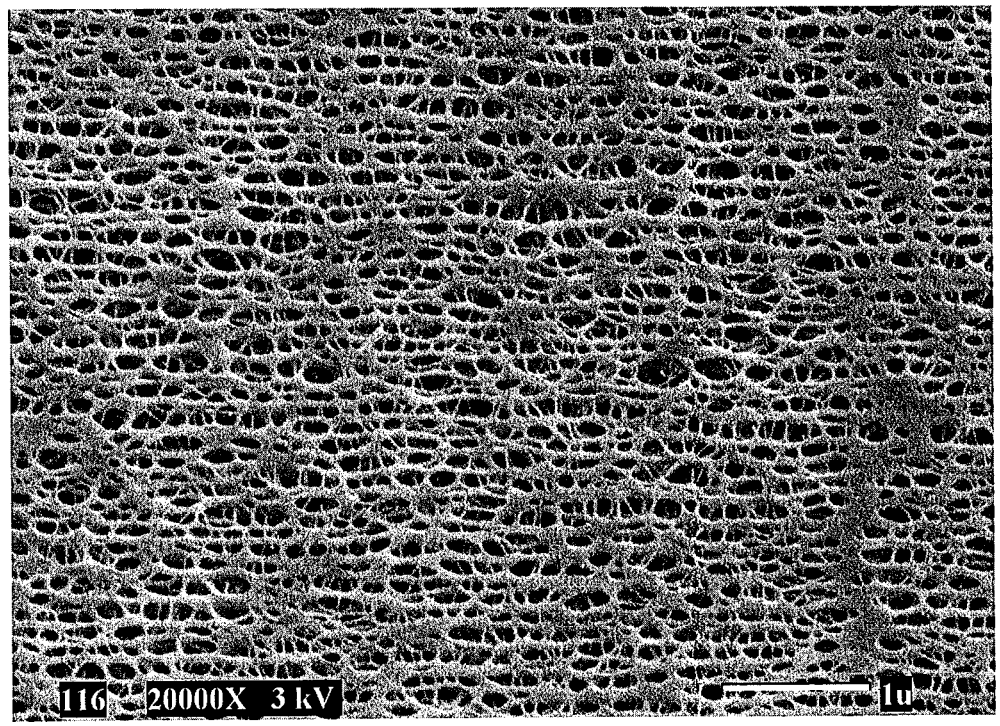
FIG. 2 is a photograph of another embodiment of the instant invention (multi-ply membrane, plies laminated together then stretched).
Figure 3:
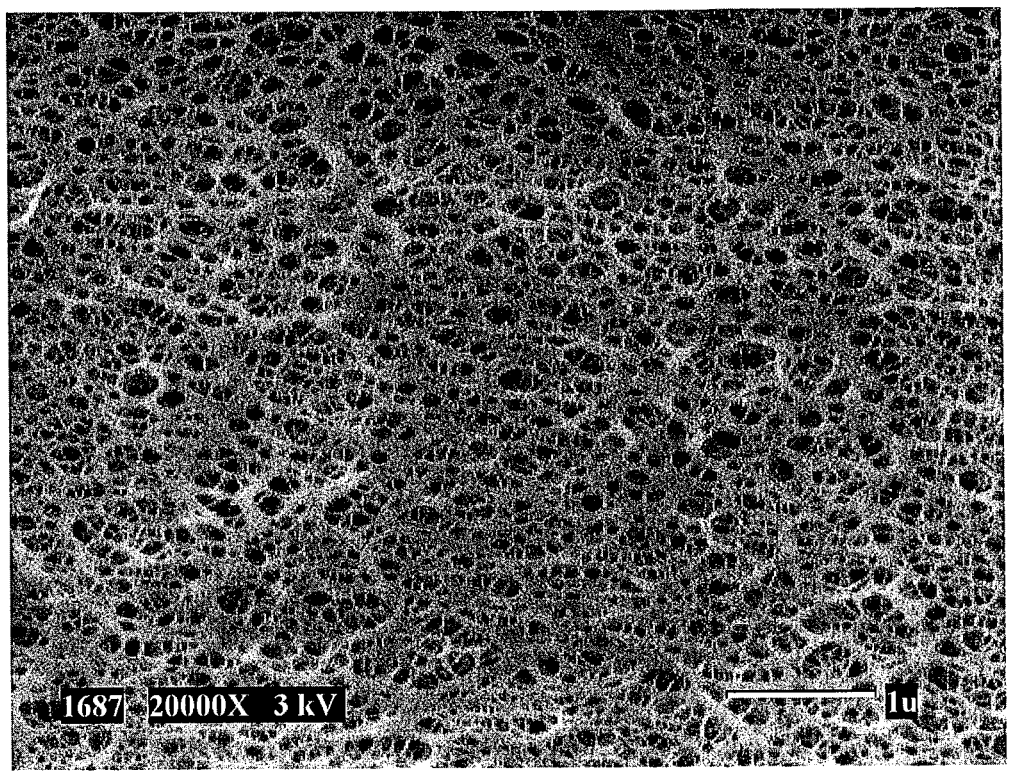
FIG. 3 is a photograph of another embodiment of the instant invention (multi-ply membrane, plies coextruded then stretched).
Figure 4:
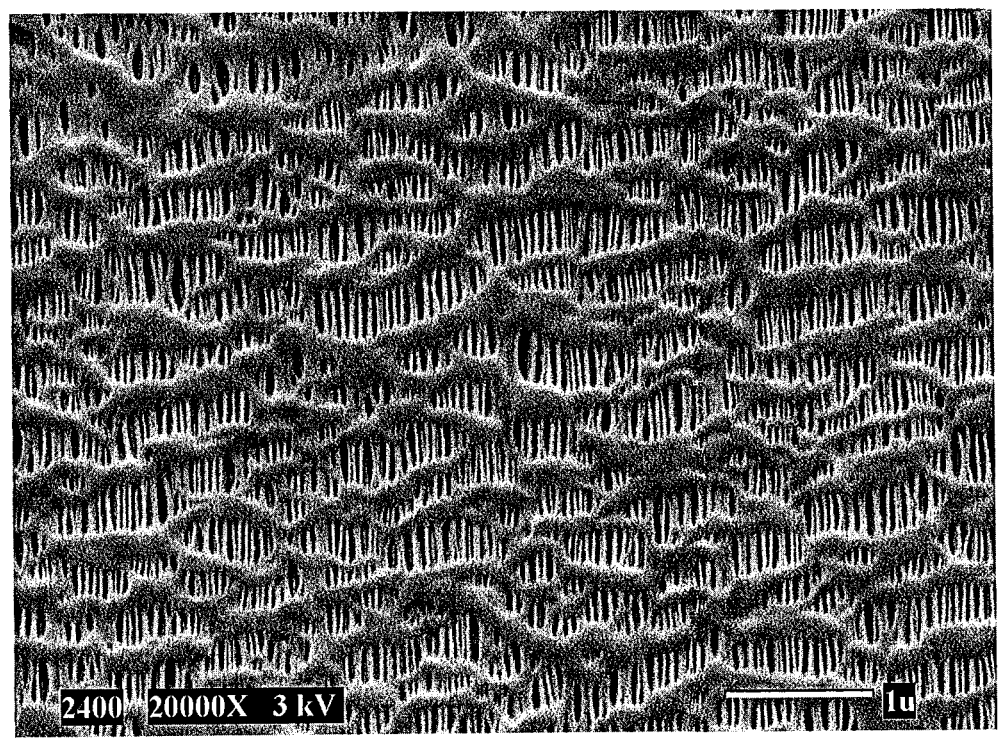
FIG. 4 is a photograph of a prior art dry-stretched membrane (single ply membrane).
Figure 5:
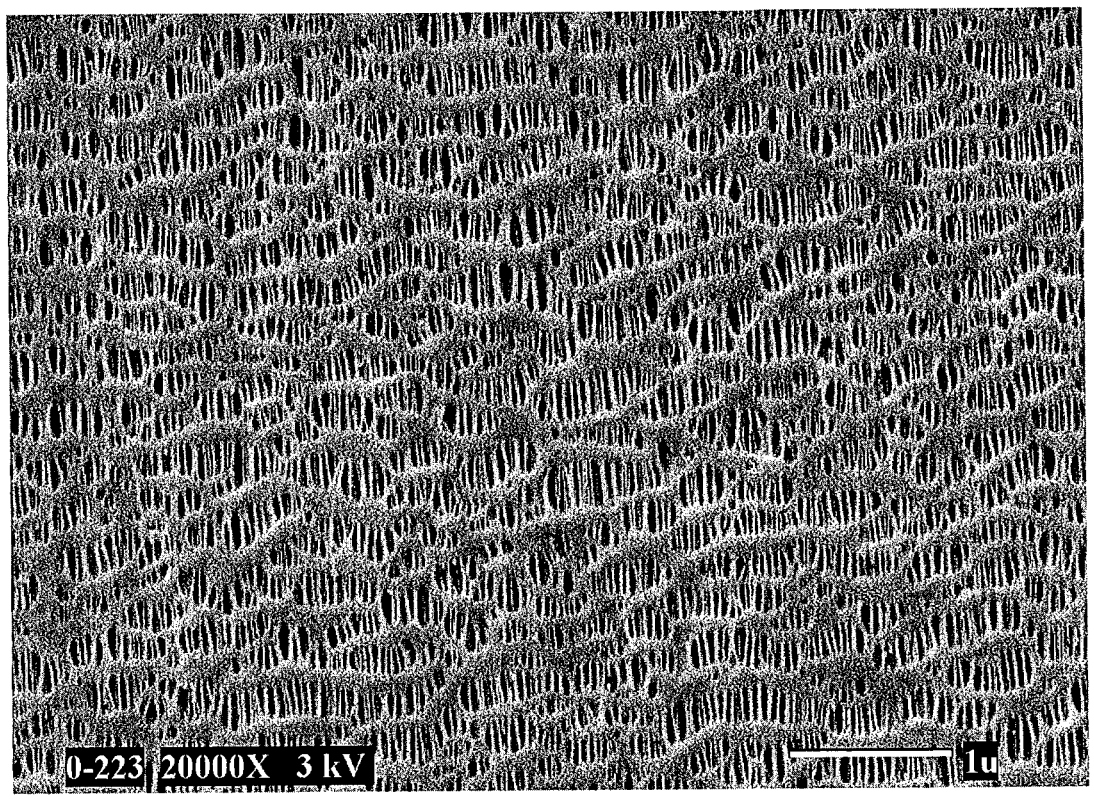
FIG. 5 is a photograph of a prior art dry-stretched membrane (multi-ply membrane, plies laminated then stretched).

Regarding the pore shape, the pores are characterized as substantially round shaped. See, FIGS. 1-3. This pore shape is contrasted with the slit shaped pores of the prior art dry-stretched membranes. See FIGS. 4-5 and Kesting, Ibid.

Further, the pore shape of the instant membrane may be characterized by an aspect ratio, the ratio of the length to the width of the pore. In one embodiment of the instant membrane, the aspect ratio ranges from 0.75 to 1.25. This is contrasted with the aspect ratio of the prior dry-stretched membranes which are greater than 5.0. See Table below.

Regarding the ratio of machine direction tensile strength to transverse direction tensile strength, in one embodiment, this ratio is between 0.5 to 5.0. This ratio is contrasted with the corresponding ratio of the prior art membranes which is greater than 10.0. See Table below.

The instant membrane may be further characterized as follows: an average pore size in the range of 0.03 to 0.30 microns ($\mu$); a porosity in the range of 20-80%; and/or a transverse direction tensile strength of greater than 250 $Kg/cm^2$. The foregoing values are exemplary values and are not intended to be limiting, and accordingly should be viewed as merely representative of the instant membrane.

The polymers used in the instant membrane may be characterized as thermoplastic polymers. These polymers may be further characterized as semi-crystalline polymers. In one embodiment, semi-crystalline polymer may be a polymer having a crystallinity in the range of 20 to 80%. Such polymers may be selected from the following group: polyolefins, fluorocarbons, polyamides, polyesters, polyacetals (or polyoxymethylenes), polysulfides, polyvinyl alcohols, co-polymers thereof, and combinations thereof. Polyolefins may include polyethylenes (LDPE, LLDPE, HDPE, UHMWPE), polypropylene, polybutene, polymethylpentene, co-polymers thereof, and blends thereof. Fluorocarbons may include polytetrafluoroethylene (PTFE), polychlorotrifluoroethylene (PCTFE), fluorinated ethylene propylene (FEP), ethylene chlortrifluoroethylene (ECTFE), ethylene tetrafluoroethylene (ETFE), polyvinylidene fluoride (PVDF), polyvinylfluoride (PVF), prefluoroalkoxy (PFA) resin, co-polymers thereof, and blends thereof. Polyamides may include, but are not limited to: polyamide 6, polyamide 6/6, Nylon 10/10, polyphthalamide (PPA), co-polymers thereof, and blends thereof. Polyesters may include polyester terephthalate (PET), polybutylene terephthalate (PBT), poly-1-4-cyclohexylenedimethylene terephthalate (PCT), polyethylene naphthalate (PEN), and liquid crystal polymers (LCP). Polysulfides include, but are not limited to, polyphenylsulfide, polyethylene sulfide, co-polymers thereof, and blends thereof. Polyvinyl alcohols include, but are not limited to, ethylene-vinyl alcohol, co-polymers thereof, and blends thereof.

The instant membrane may include other ingredients, as is well known. For example, those ingredients may include: fillers (inert particulates used to reduce the cost of the membrane, but otherwise having no significant impact on the manufacture of the membrane or its physical properties), anti-static agents, anti-blocking agents, anti-oxidants, lubricants (to facilitate manufacture), and the like.

Various materials may be added to the polymers to modify or enhance the properties of the membrane. Such materials include, but are not limited to: (1) polyolefins or polyolefin oligomers with a melting temperature less than 130° C.; (2) Mineral fillers include, but are not limited to: calcium carbonate, zinc oxide, diatomaceous earth, talc, kaolin, synthetic silica, mica, clay, boron nitride, silicon dioxide, titanium dioxide, barium sulfate, aluminum hydroxide, magnesium hydroxide and the like, and blends thereof; (3) Elastomers include, but are not limited to: ethylene-propylene (EPR), ethylene-propylene-diene (EPDM), styrene-butadiene (SBR), styrene isoprene (SIR), ethylidene norbornene (ENB), epoxy, and polyurethane and blends thereof; (4) Wetting agents include, but are not limited to, ethoxylated alcohols, primary polymeric carboxylic acids, glycols (e.g., polypropylene glycol and polyethylene glycols), functionalized polyolefins etc; (5) Lubricants, for example, silicone, fluoropolymers, Kemamide®, oleamide, stearamide, erucamide, calcium stearate, or other metallic stearate; (6) flame retardants for example, brominated flame retardants, ammonium phosphate, ammonium hydroxide, alumina trihydrate, and phosphate ester; (7) cross-linking or coupling agents; (8) polymer processing aid; and (9) Any types of nucleating agents including beta-nucleating agent for polypropylene. (The instant membrane, however, specifically excludes any beta-nucleated polypropylene as disclosed in U.S. Pat. No. 6,602,593, incorporated herein by reference. A beta-nucleated polypropylene is a substance that causes the creation of beta crystals in polypropylene.)

The instant membrane may be a single ply or multi-ply membrane. Regarding the multi-ply membrane, the instant membrane may be one ply of the multi-ply membrane or the instant membrane may be all of the plies of the multi-ply membrane. If the instant membrane is less than all of the plies of the multi-ply membrane, the multi-ply membrane may be made via a lamination process. If the instant membrane is all plies of the multi-ply membrane, the multi-ply membrane may be made via an extrusion process. Further, multi-ply membranes may be made of plies of the same materials or of differing materials.

The instant membrane is made by a dry-stretch process where the precursor membrane is biaxially stretched (i.e., not only stretched in the machine direction, but also in the transverse machine direction). This process will be discussed in greater detail below.

In general, the process for making the foregoing membrane includes the steps of extruding a nonporous precursor, and then biaxially stretching the nonporous precursor. Optionally, the nonporous precursor may be annealed prior to stretching. In one embodiment, the biaxial stretching includes a machine direction stretch and a transverse direction with a simultaneous controlled machine direction relax. The machine direction stretch and the transverse direction stretch may be simultaneous or sequential. In one embodiment, the machine direction stretch is followed by the transverse direction stretch with the simultaneous machine direction relax. This process is discussed in greater detail below.

Extrusion is generally conventional (conventional refers to conventional for a dry-stretch process). The extruder may have a slot die (for flat precursor) or an annular die (for parison precursor). In the case of the latter, an inflated parison technique may be employed (e.g., a blow up ratio (BUR)). However, the birefringence of the nonporous precursor does not have to be as high as in the conventional dry-stretch process. For example, in the conventional dry-stretch process to produce a membrane with a >35% porosity from a polypropylene resin, the birefringence of the precursor would be >0.0130; while with the instant process, the birefringence of the PP precursor could be as low as 0.0100. In another example, a membrane with a >35% porosity from a polyethylene resin, the birefringence of the precursor would be >0.0280; while with the instant process, the birefringence of the PE precursor could be as low as 0.0240.

Annealing (optional) may be carried out, in one embodiment, at temperatures between $T_m$-80° C. and $T_m$-10° C. (where $T_m$ is the melt temperature of the polymer); and in another embodiment, at temperatures between $T_m$-50° C.

and $T_m$-15° C. Some materials, e.g., those with high crystallinity after extrusion, such as polybutene, may require no annealing.

Machine direction stretch may be conducted as a cold stretch or a hot stretch or both, and as a single step or multiple steps. In one embodiment, cold stretching may be carried out at <$T_m$-50° C., and in another embodiment, at <$T_m$-80° C. In one embodiment, hot stretching may be carried out at <$T_m$-10° C. In one embodiment, total machine direction stretching may be in the range of 50-500%, and in another embodiment, in the range of 100-300%. During machine direction stretch, the precursor may shrink in the transverse direction (conventional).

Transverse direction stretching includes a simultaneous controlled machine direction relax. This means that as the precursor is stretched in the transverse direction the precursor is simultaneously allowed to contract (i.e., relax), in a controlled manner, in the machine direction. The transverse direction stretching may be conducted as a cold step, or a hot step, or a combination of both. In one embodiment, total transverse direction stretching may be in the range of 100-1200%, and in another embodiment, in the range of 200-900%. In one embodiment, the controlled machine direction relax may range from 5-80%, and in another embodiment, in the range of 15-65%. In one embodiment, transverse stretching may be carried out in multiple steps. During transverse direction stretching, the precursor may or may not be allowed to shrink in the machine direction. In an embodiment of a multi-step transverse direction stretching, the first transverse direction step may include a transverse stretch with the controlled machine relax, followed by simultaneous transverse and machine direction stretching, and followed by transverse direction relax and no machine direction stretch or relax.

Optionally, the precursor, after machine direction and transverse direction stretching may be subjected to a heat setting, as is well known.

The foregoing membrane and process are further illustrated in the following non-limiting examples.

EXAMPLES

The test values reported herein, thickness, porosity, tensile strength, and aspect ratio, were determined as follows: thickness-ASTM-D374 using the Emveco Microgage 210-A micrometer; porosity-ASTM D-2873; tensile strength-ASTM D-882 using an Instron Model 4201; and aspect ratio-measurements taken from the SEM micrographs.

The following examples were produced by conventional dry-stretched techniques, except as noted.

Example 1

Polypropylene (PP) resin is extruded using a 2.5 inch extruder. The extruder melt temperature is 221° C. Polymer melt is fed to a circular die. The die temperature is set at 220° C., polymer melt is cooled by blowing air. Extruded precursor has a thickness of 27μ and a birefringence of 0.0120. The extruded film was then annealed at 150° C. for 2 minutes. The annealed film is then cold stretched to 20% at room temperature, and then hot stretched to 228% and relaxed to 32% at 140° C. The machine direction (MD) stretched film has a thickness of 16.4 micron (μ), and porosity of 25%. The MD stretched film is then transverse direction (TD) stretched 300% at 140° C. with MD relax of 50%. The finished film has a thickness of 14.1 microns, and porosity of 37%. TD tensile strength of finished film is 550 Kg/cm². See FIG. 1.

Example 2

Polypropylene (PP) resin is extruded using a 2.5 inch extruder. The extruder melt temperature is 220° C. Polymer melt is fed to a circular die. The die temperature is set at 200° C., polymer melt is cooled by blowing air. Extruded precursor has a thickness of 9.5μ and a birefringence of 0.0160. HDPE resin is extruded using a 2.5 inch extruder. The extruder melt temperature is 210° C. Polymer melt is fed to a circular die. Die temperature is set at 205° C., polymer melt is cooled by air. Extruded precursor has a thickness of 9.5μ and a birefringence of 0.0330. Two PP layers and one PE layers are laminated together to form a PP/PE/PP tri-layer film. Lamination roll temperature is 150° C. Laminated tri-layer film is then annealed at 125° C. for 2 minutes. The annealed film is then cold stretched to 20% at room temperature, and then hot stretched to 160% and relaxed to 35% at 113° C. The MD stretched film has a thickness of 25.4 micron, and porosity of 39%. The MD stretched film is then TD stretched 400% at 115° C. with MD relax of 30%. The finished film has a thickness of 19.4 microns and porosity of 63%. TD tensile strength of finished film is 350 Kg/cm². See FIG. 2.

Example 3

PP resin and HDPE resin are extruded using a co-extrusion die to form a PP/PE/PP tri-layer film. Extruder melt temperature for PP is 243° C., and extruder melt temperature for PE is 214° C. Polymer melt is then fed to a co-extrusion die which is set at 198° C. Polymer melt is cooled by blowing air. The extruded film has a thickness of 35.6 microns. The extruded precursor is then annealed at 125° C. for 2 minutes. The annealed film is then cold stretched to 45% at room temperature and hot stretched to 247% and relaxed to 42% at 113° C. The MD stretched film has a thickness of 21.5 microns and porosity of 29%. The MD stretched film is then TD stretched 450% at 115° C. with 50% MD relax. The finished film has a thickness of 16.3 microns and porosity of 59%. TD tensile strength of finished film is 570 Kg/cm².

Example 4

PP resin and HDPE resin are co-extruded and MD stretched the same way as in example 3. The MD stretched film is then TD stretched 800% at 115° C. with 65% MD relax. The finished film has a thickness of 17.2 microns and porosity of 49%. TD tensile strength of finished film is 730 Kg/cm². See FIG. 3.

Example 5

PP resin and PB resin are extruded using a co-extrusion die. Extruder melt temperature for PP is 230° C., and extruder melt for PB is 206° C. Polymer melt is then fed to a co-extrusion die which is set at 210° C. Polymer melt is then cooled by blowing air. The extruded film has a thickness of 36.0 microns. The extruded precursor is then annealed at 105° C. for 2 minutes. The annealed film is then cold stretched to 20%, and then hot stretched at 105° C. to 155% and then relaxed to 35%. The MD stretched film is then TD stretched 140% at 110° C. with 20% MD relax. The finished film has a thickness of 14.8 microns and porosity of 42%. TD tensile strength of finished film is 286 Kg/cm².

Example 6

PP resin and PE resin are extruded using a co-extrusion die to form a PP/PE/PP trilayer film. Extruder melt temperature for PP is 245° C., and extruder melt temperature for PE is 230° C. Polymer melt is then fed to a co-extrusion die which is set at 225° C. Polymer melt is cooled by blowing air. The extruded film has a thickness of 27 microns and a birefringence of 0.0120. The extruded precursor is then annealed at 115° C. for 2 minutes. The annealed film is then cold stretched to 22% at room temperature and hot stretched to 254% and relaxed to 25% at 120° C. (total machine direction stretch=251%). The MD stretched film has a thickness of 15 microns and porosity of 16%. The MD stretched film is then TD stretched 260% at 130° C. with 50% MD relax, followed by a simultaneous MD and TD stretch of 50% and 216% in each direction at 130° C., and finally the film is held fast in the MD (100%) and allowed to relax 57.6% in the TD at a temperature of 130° C. The finished film has a thickness of 7.6 microns and porosity of 52%. TD tensile strength of finished film is 513 Kg/cm².

Example 7

PP resin and PE resin are extruded using a co-extrusion die to form a PP/PE/PP trilayer film. Extruder melt temperature for PP is 222° C., and extruder melt temperature for PE is 225° C. Polymer melt is then fed to a co-extrusion die which is set at 215° C. Polymer melt is cooled by blowing air. The extruded film has a thickness of 40 microns and birefringence of 0.0110. The extruded precursor is then annealed at 105° C. for 2 minutes. The annealed film is then cold stretched to 36% at room temperature and hot stretched to 264% and relaxed to 29% at 109° C. (total machine direction stretch=271%). The MD stretched film has a thickness of 23.8 microns and porosity of 29.6%. The MD stretched film is then TD stretched 1034% at 110° C. with 75% MD relax. The finished film has a thickness of 16.8 microns and porosity of 46%. TD tensile strength of finished film is 1037 Kg/cm².

In the following table the results of the foregoing experiments are summarized and compared to two commercially available dry-stretched membranes: A) CELGARD® 2400 (single ply polypropylene membrane), See FIG. 4; and B) CELGARD® 2300 (tri-layer polypropylene/polyethylene/polypropylene), see FIG. 5.

TABLE

|  | TD stretching | Thickness (um) | Porosity | TD Tensile strength (kg/cm²) | MD Tensile strength (kg/cm²) | MD/TD tensile ratio | Aspect ratio |
|---|---|---|---|---|---|---|---|
| A | N/A | 25.4 | 37% | 160 | 1700 | 10.6 | 6.10 |
| B | N/A | 25.1 | 40% | 146 | 1925 | 13.2 | 5.50 |
| Ex 1 | 300% | 14.1 | 37% | 550 | 1013 | 1.8 | 0.90 |
| Ex 2 | 400% | 19.4 | 63% | 350 | 627 | 1.8 | 0.71 |
| Ex 3 | 450% | 16.3 | 59% | 570 | 754 | 1.3 | — |
| Ex 4 | 800% | 17.2 | 49% | 730 | 646 | 0.9 | 0.83 |
| Ex 5 | 140% | 14.8 | 42% | 286 | 1080 | 3.8 | — |
| Ex 6 | 418% | 7.6 | 52% | 513 | 1437 | 2.8 | — |
| Ex 7 | 1034% | 16.8 | 46% | 1037 | 618 | 0.6 | — |

The present invention may be embodied in other forms without departing from the spirit and the essential attributes thereof, and, accordingly, reference should be made to the appended claims, rather than to the foregoing specification, as indicated the scope of the invention. Further, all numerical ranges set forth herein should be considered as approximate ranges and not necessarily as absolute ranges.

We claim:

1. A method of making a microporous membrane comprising the steps of:
   extruding a polymer into a nonporous precursor, and
   biaxially stretching the nonporous precursor, the biaxial stretching including a machine direction stretching and a transverse direction stretching, the transverse direction stretching including a simultaneous controlled machine direction relax in the range of 20 to 75%;
   wherein the total transverse direction stretch being in the range of 400 to 1200%.

2. The method of claim 1 wherein the polymer excludes any oils for subsequent removal to form pores or any pore-forming particulate to facilitate pore formation.

3. The method of claim 1 wherein the polymer being a semi-crystalline polymer.

4. The method of claim 1 wherein the polymer being selected from the group consisting of polyolefins, fluorocarbons, polyamides, polyesters, polyacetals, polyoxymethylenes, polysulfides, polyvinyl alcohols, co-polymers thereof, and combinations thereof.

5. The method of claim 1 further comprising the step of:
   annealing the nonporous precursor after extruding and before
   biaxially stretching.

6. The method of claim 5 wherein annealing being conducted at a temperature in the range of Tm-80° C. to Tm-10° C.

7. The method of claim 1 wherein biaxially stretching comprising the steps of:
   machine direction stretching, and
   thereafter transverse direction stretching including a simultaneous controlled machine direction relax.

8. The method of claim 7 wherein machine direction stretching being conducted hot or cold or both.

9. The method of claim 8 wherein cold machine direction stretching being conducted at a temperature <Tm-50° C.

10. The method of claim 8 wherein hot machine direction stretching being conducted at a temperature <Tm-10° C.

11. The method of claim 1 wherein the total machine direction stretch being in the range of 50-500%.

12. The method of claim 1 wherein the total transverse direction stretch being in the range of 100-1200%.

13. The method of claim 1 wherein the machine direction relax being in the range of 30-80%.

* * * * *